Dec. 26, 1967     A. R. GETZIN     3,360,120
PLEATED FILTER ELEMENT PACKAGE
Filed Nov. 22, 1965
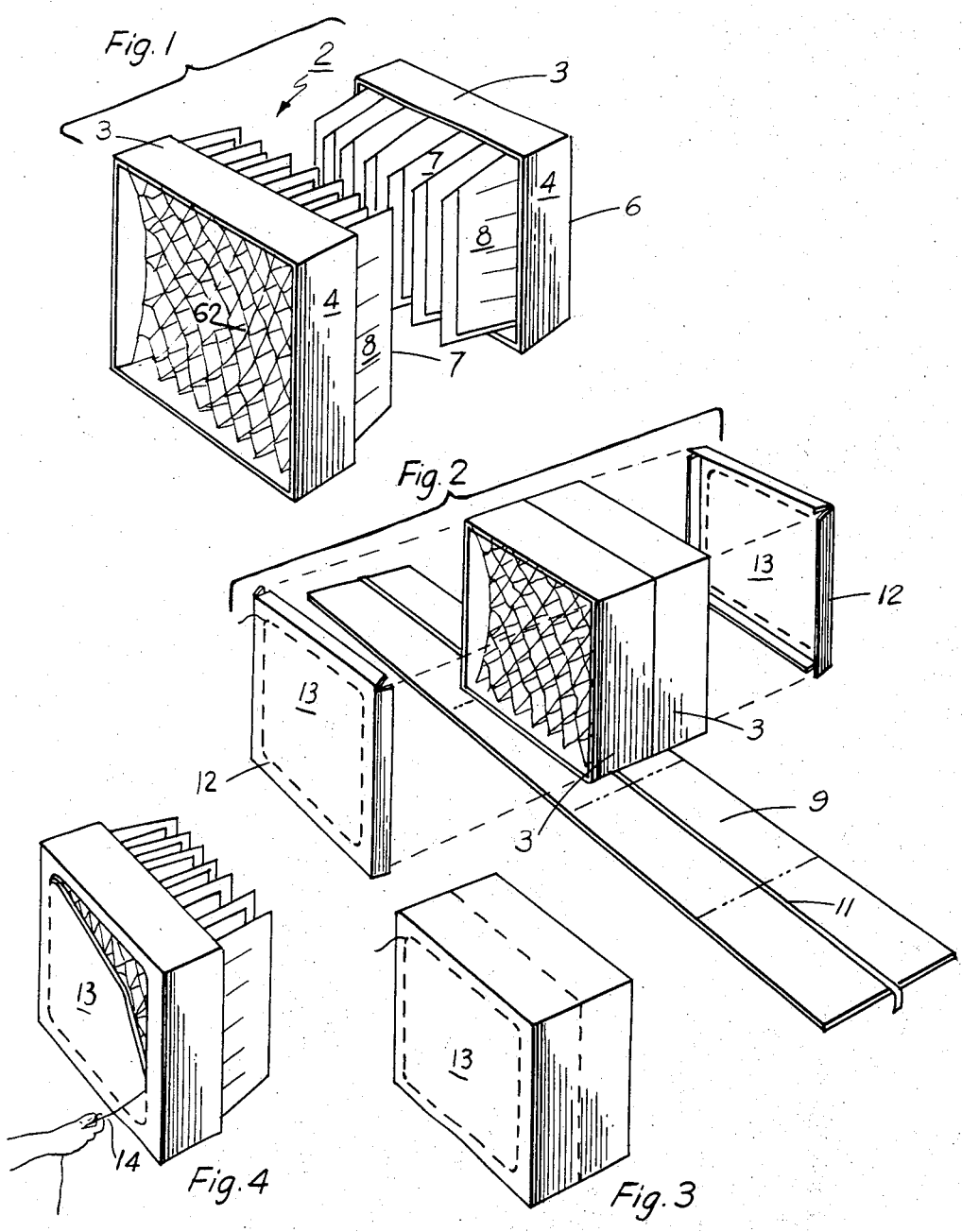
INVENTOR.
Allan R. Getzin
BY
Ralph B. Brick

United States Patent Office 3,360,120
Patented Dec. 26, 1967

3,360,120
PLEATED FILTER ELEMENT PACKAGE
Allan R. Getzin, Jeffersontown, Ky., assignor to American Air Filter Company, Inc., Louisville, Ky., a corporation of Delaware
Filed Nov. 22, 1965, Ser. No. 509,139
3 Claims. (Cl. 206—56)

ABSTRACT OF THE DISCLOSURE

A filter assembly comprising substantially identical unit filter members, each having pleated filter medium extending beyond the downstream edge thereof, the filter members being placed in downstream edge-to-edge abutting relationship with their pleats in nesting relationship and surrounded by a binder strip for shipment, storage and handling.

---

The present invention relates to fluid filters, and more particularly, to an improved arrangement for assembling a plurality of unit filters for efficient shipment, storage, and handling.

In accordance with the present invention, a novel filter assembly arrangement is provided which permits a number of unit filters, particularly of the pleat type, to be assembled together in a minimum of time to occupy a minimum of space for efficient shipment and storage. At the same time, the present invention provides a novel filter assembly arrangement which permits ready access to the assembled filter units so as to permit individual filter units to be placed in operation efficiently with a minimum of handling effort.

Various other features of the present invention will become obvious to one skilled in the art upon reading the disclosure set forth hereinafter.

More particularly, the present invention provides a filter assembly comprising at least two substantially identical unit filter members, each including a border frame means defining an open upstream and downstream end to permit fluid flow therethrough and having filter medium means disposed transverse the direction of fluid flow between the upstream and downstream ends of the border frame means, the unit filter members having their border frame means positioned in faced, end-to-end, abutting relationship to each other; a binder strip having a breadth substantially equal to the additive breadth of the border frame means of the faced, end-to-end positioned unit filter members, the binder strip surrounding and fastened to the border frame means to hold the unit filter members together for shipping purposes; and tear means on the binder strip substantially adjacent the plane of abutment of the faced, end-to-end positioned unit filter members to permit separation of the filter members for individual use.

It is to be understood that various changes can be made by one skilled in the art in the arrangement, form, and construction of the apparatus disclosed herein without departing from the scope or spirit of the present invention.

Referring to the drawing which discloses one advantageous embodiment of the present invention;

FIGURE 1 is an exploded perspective view of two unit filters of the pleat type disclosed in spaced, unassembled, end-to-end relationship;

FIGURE 2 is an exploded perspective view of the unit filter members of FIGURE 1 positioned in end-to-end abutting relationship and ready for packaging into the inventive filter assembly;

FIGURE 3 is a perspective view of a packaged filter assembly of the unit filter members of FIGURES 1 and 2; and FIGURE 4 is a perspective view of one of the unit filter members of FIGURES 1 to 3, with the cover panel being removed.

As can be seen in the drawing, filter assembly 2 as disclosed includes two substantially identical unit filter members 3. Each filter member 3 includes an open-ended flowthrough border frame 4. Frame 4, which can be any one of a number of geometric configurations, advantageously, is disclosed as being rectangular in shape. The frame, which can be formed from a suitable stiff cardboard material, serves to define an open upstream end 6 and an open downstream end 7. Disposed within frame 4 is filter medium member 8 which is arranged to extend transverse the direction of fluid flow between ends 6 and 7. In the embodiment disclosed, filter medium 8 is shown in pleat shape form with the pleats extending beyond the downstream edge of border frame 4. It is to be understood that medium 8 can be formed from any one of a number of suitable filtering materials known in the art, the particular medium selected being determined by the intended use of the unit filter. As can be observed in FIGURE 1 of the drawing, for packaging, unit filters 3 are placed in end-to-end relationship with the downstream ends thereof facing. The unit filters are then positioned so that frames 4 are in abutting relationship to each other with the pleats thereof internesting. When this has been accomplished, a binder strip 9, which also can be of stiff cardboard material and which has a breadth substantially equal to the additive breadth of border frames 4 of the two unit filters, is arranged to surround border frames 4 and is fastened to such border frames. It is to be understood that any one of a number of suitable fastening means such as adhesive or staples can be utilized to fasten the strip 9 to the border frames to hold the unit filter members 3 together as filter assembly 2 for shipping purposes. It is to be noted that a suitable tear ribbon 11 such as a strip of nylon can be fastened to and cooperable with the border strip to extend the length thereof and surround the perimeter of the border frame means adjacent the plane of abutment of the end-to-end positioned unit filter members to permit separation of the unit filter members from the assembly for individual use. If desired, the border strip can be scored adjacent the tear member so as to facilitate tearing when the occasion warrants.

Fastened to filter assembly 2 to cover and structurally reinforce the nonfacing upstream ends of the end-to-end positioned unit filter members 3 are the end caps 12. These end caps are scored to provide cover panels 13. A suitable tear ribbon 14 can be provided along the scoring for quick removal of the cover panels for fluid flow therethrough when the filter unit is used in operative position. It is to be noted that not only do end caps 12 serve to cover the open upstream ends of filter units 3, but, in addition, they serve to enhance the structural stability of the over-all filter assembly package, insuring against any racking during shipment and serving as a stabilizing influence when the filter unit is placed in operative position.

The invention claimed is:

1. A filter assembly comprising at least two substantially identical unit filter members, each including a border frame means defining an open upstream and downstream end to permit fluid flow therethrough and having pleated filter medium disposed transverse the direction of fluid flow between said upstream and downstream ends of said border frame means with the pleats extending beyond said downstream end of said border frame means, said unit filter members having their border frame means positioned in faced, downstream end-to-downstream end, abutting relationship to each other with the pleated filter medium of said end-to-end filter members being disposed in internesting relationship; a binder strip having a breadth substantially equal to the additive breadth of said border frame means of said faced, downstream end-to-downstream end positioned unit filter members, said binder strip surrounding and fastened to said border frame means to hold said unit filter members together for shipping purposes; and tear means on said binder strip substantially adjacent the plane of abutment of said end-to-end positioned unit filter members to permit separation of said unit filter members for individual use.

2. The apparatus of claim 1, said tear means comprising a tear ribbon fastened to and cooperable with said border strip to surround the perimeter of said border frame means.

3. The apparatus of claim 1, and end cap means to cover and structurally reinforce nonfacing ends of said end-to-end positioned unit filter members, said end cap means including scored cover panels for quick removal for fluid flow therethrough.

References Cited
UNITED STATES PATENTS

| | | | |
|---|---|---|---|
| 2,138,874 | 12/1938 | Myers | 55—359 |
| 2,605,897 | 8/1952 | Rundle | 206—65 |
| 3,026,967 | 3/1962 | Stevens et al. | 55—500 |
| 3,138,443 | 6/1964 | Engle et al. | 55—499 |
| 3,151,962 | 10/1964 | O'Dell | 55—350 |
| 3,190,059 | 6/1965 | Bauder et al. | 55—499 X |
| 3,217,472 | 11/1965 | Babbitt et al. | 55—484 X |
| 3,246,457 | 4/1966 | Baun | 55—499 |

REUBEN FRIEDMAN, *Primary Examiner.*

F. SPEAR, *Assistant Examiner.*